United States Patent [19]
Curti

[11] 3,885,882
[45] May 27, 1975

[54] COUPLING FOR THE ASSEMBLY OF CLOSELY JOINTED TUBULAR ELEMENTS

[76] Inventor: Lucien Curti, Le Clos Fleuri-rue Pierre Vaudnay, 78350 Jouy en Josas, France

[22] Filed: May 15, 1973

[21] Appl. No.: 360,451

[30] Foreign Application Priority Data
May 17, 1972  France .............................. 72.17672

[52] U.S. Cl. .................. 403/297; 52/585; 403/374; 403/409
[51] Int. Cl. ............................................. F16b 7/18
[58] Field of Search .......... 403/172, 171, 176, 263, 403/297, 358, 374, 314, 355, 409; 85/66, 79; 52/475, 585, 656, 758 H, 758 R, 726; 279/2 R

[56] References Cited
UNITED STATES PATENTS

| | | | |
|---|---|---|---|
| 2,480,429 | 8/1949 | Wade................................ | 403/409 |
| 2,494,878 | 1/1950 | Jensen ............................... | 403/409 |
| 3,198,562 | 8/1965 | Smith................................ | 403/374 |
| 3,296,764 | 1/1967 | Tremblay.............................. | 85/79 |
| 3,437,362 | 4/1969 | Offenbroich......................... | 52/585 |
| 3,528,691 | 9/1970 | Matich, Jr............................. | 85/79 |

*Primary Examiner*—Werner H. Schroeder
*Assistant Examiner*—Conrad L. Berman
*Attorney, Agent, or Firm*—Edwin E. Greigg

[57] ABSTRACT

A coupling used in the assembly of closely jointed tubular elements including a branch member for each tubular member to be joined in assembly. Each branch member is situated within a respective tubular element with a certain play and set or blocked therein. Blocking is accomplished by the displacement of a key portion of the branch member. The key portion is displaced through the action of a pointed-end screw in a direction which is perpendicular to the longitudinal axis of the respective body portion of the branch member and inclined with respect to each of the planes of the angles defined respectively by the plane containing the axis of the respective branch member on the one hand and the planes containing the axes of the other branch members on the other hand, in such a way as to obtain a resultant displacement directed toward the exterior of each of the angles and to cause in that direction a slight lateral displacement of the corresponding tubular element. As a result, the visible junction line between jointed tubular elements is closed.

4 Claims, 12 Drawing Figures

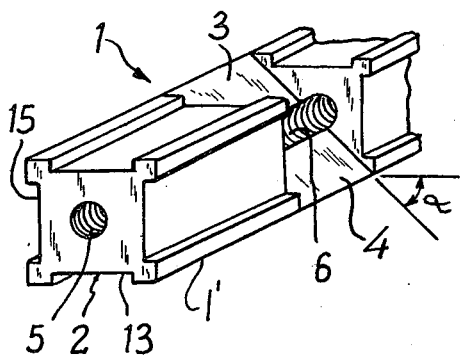
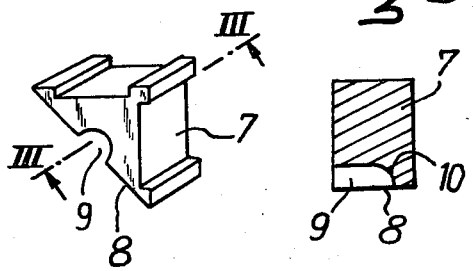
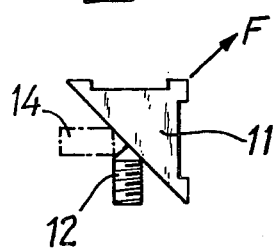
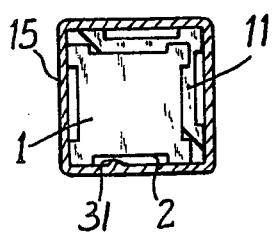
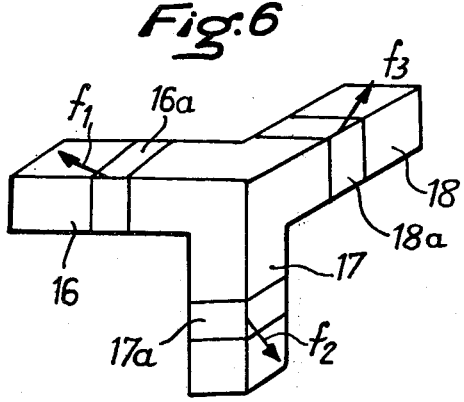
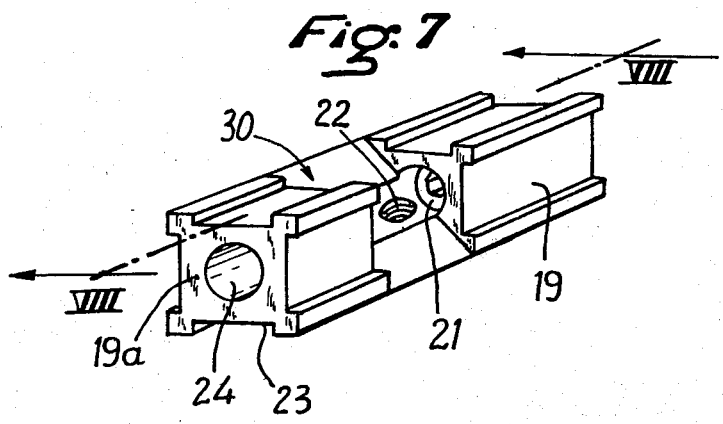

COUPLING FOR THE ASSEMBLY OF CLOSELY JOINTED TUBULAR ELEMENTS

BACKGROUND OF THE INVENTION

The present invention relates to couplings for tubular elements, and more particularly to couplings which permit the closely jointed assembly of tubular elements. The couplings are of the type which comprise a body intended to be fitted into a respective tubular element to be assembled and to be wedged therein by a key sliding in the body perpendicularly to the axis of the particular tubular element, and under the action of a manipulating element.

Couplings of the type identified are known, where the body of the coupling is generally made of a rigid molded substance, for example an alloy of zinc, copper, aluminium and magnesium moulded under pressure.

The coupling has as many branch members as there are tubular elements to be assembled. The branch members extend in the direction of the respectively different tubular elements of the assembly to be joined and have a cross section which is smaller but geometrically similar to that of the tubular element within which it extends. Thus, these couplings can have the form of square crosses, or form the legs of a trihedral angle. Each branch of the coupling has a cross-section which may be circular, square, rectangular, triangular, oval, etc. corresponding to the cross-section of the particular tubular element with which it is to be assembled. The cross-sectional dimensions, however, are slightly less than those of the internal cross-section of the corresponding tubular element so as to permit easy fitting of the branch member therein. Each of the branch members is provided with a body portion having a lateral cut-out portion or slot in which the key portion slides laterally.

In a large number of applications, especially in metallic joints, it is necessary from an esthetic point of view that the tubular elements be perfectly joined along their coupling lines. To effect this end they are, of course, precision beveled according to a well determined angle. Moreover, it is further necessary that when the coupling is blocked-in or set within the tubular elements that the displacement which each tubular element undergoes with respect to the axis of the corresponding branch member of the coupling under the pressure of the key portion of the corresponding branch member, does not result in a separation of the visible edges of the joints. However, this is precisely what happens with the majority of the known couplings whose blocking shoes or blocking keys cause a poorly directed or non-directed lateral displacement of the tubular elements. Nor is this displacement negligible, because the cross section of the branch members of the coupling element may sometimes be considerably smaller than the inside cross section of the tubular elements. In effect, the internal dimensions of the tubular elements, independently of the tolerances for equal external dimensions, vary in a significant way depending on the material of which the tubular elements are made. The nature of the material determines the thickness of the walls of the tubular elements and so as not to considerably increase the number of coupling models, it is necessary, for a given external cross section of the tubular element, to select a coupling whose branch members have a cross section corresponding to the smallest standard internal cross section of such a tubular element. That is to say, the same coupling will fit with little play in a brass tubular element, for example, but with considerably play in a tubular element made of stainless steel.

To overcome this disadvantage it has been proposed to make couplings which carry opposite keys which act simultaneously in such a way that each tubular element remains coaxial with the corresponding branch member of the coupling. In order to obtain a perfect coupling with close joints one must, therefore, maintain the tubular element in a definite position during the entire duration of its blocking operation, which is difficult and increases the assembly time considerably.

When there is one key portion for each branch member of the coupling, it is known to utilize a wedge of appropriate form to achieve displacement of the key portion. The key portion moves along the longitudinal axis of the body portion of the branch member under the action of a pushing or pulling screw. Access to the head of the screw can only be obtained through one of the extremities of the tubular element or through a large lateral opening therein. Such an opening, which is in any case indispensible in order to accommodate the last side of a frame, for example, entails a serious weakening of the tubular section.

OBJECTS AND SUMMARY OF THE INVENTION

It is, therefore, an object of the present invention to provide an improved coupling for the assembly of closely joined tubular elements which includes a key portion on each of its branch members, the key portion being formed by a structural member lodged in a lateral cut or slot of the body portion of the branch member and characterized in that each key portion is subject to the action of a pointed-end screw which exerts upon the key portion a pushing force resulting in displacement of the key portion in a direction which is perpendicular to the longitudinal axis of the respective body portion, the displacement being inclined with respect to each of the planes of the angles defined respectively by the plane containing the axis of the respective branch member on the one hand and the planes containing the axes of the other branch members on the other hand, in such a way that the resultant displacement is directed toward the exterior of each of the angles. In this way a small displacement of the corresponding tubular element in the direction of the resultant displacement with respect to the axis of the branch member is fixed. This displacement results in the closing of the visible junction line of the tubular element with the adjacent tubular element or elements.

Preferably each key portion has a cross section perpendicular to the axis of its respective body portion which is approximately half as large as the cross section of the body portion itself and is equipped, just as is each body portion, with bearing ribs toward the inner surface of the tubular element.

It is clear that the pointed-end screw may advance along the axis of the branch member or, on the contrary, it may advance perpendicularly to that axis. In the former case, the key portion is provided with a cut-out in its surface which faces toward the bottom of the body portion slot. The cut-out terminates in a semi-conical surface against which the screw end engages. That is, the tip of the conical end of the pointed-end screw engages the semi-conical surface. In the latter case, the surface of the key portion which faces toward the bottom of the body portion slot is flat and parallel to the axis of its respective body portion and inclined at an angle of α degrees to one of the other faces of that respective body portion. In addition the pointed-end screw whose conical end has an apex angle of 180 − 2α degrees engages a threaded bore which extends through the branch member near its center and opens into the body portion slot at one end and into one of the outer surfaces of the body portion at the other end.

It is equally necessary to be able to construct T-shaped assemblies in which a tubular element is affixed by one of its extremities to the lateral side of another tubular element. For this purpose the latter tubular element is provided with a lateral opening within which a "hidden" coupling is fixed. The coupling is then fixed and wedged in the first tubular element by any classic system and preferably by a device identical to the one which has been described above, the key portion being pushed by a pointed-end screw moving laterally from the non-visible face of the tubular element. In other words, it is necessary to make a coupling with a single branch member or, more exactly, with two branch members end to end, one having a key portion moved laterally as has been described, and the other having at its free end means for effecting a hidden hook-up and locking. Such hook-up means are known, however they all necessitate a particular and in no case circular configuration for the opening which is intended to receive them, which complicates the design of the tubular elements.

It is therefore another object of the present invention to provide an end coupling intended to be engaged and blocked while hidden in a circular opening of the side wall of a tubular element or of any other closed tubular element.

These and other objects are accomplished according to the present invention by the provision of a coupling having as many branch members as there are tubular elements to be joined in assembly, with each branch member being situated within a respective tubular element with a certain play and set or blocked therein by the displacement of a key portion by a pointed-end screw which causes the key portion to be displaced in a direction which is perpendicular to the longitudinal axis of the respective body portion of the branch member and inclined with respect to each of the planes of the angles defined respectively by the plane containing the axis of the respective branch member on the one hand, and the planes containing the axes of the other branch members on the other hand, in such a way as to obtain a resultant displacement directed toward the exterior of each of the angles and to cause in that direction a slight lateral displacement of the corresponding tubular element so that the visible junction line of the tubular elements in assembly with their adjacent tubular elements is closed.

According to the present invention, such a coupling would comprise a body whose cross-section corresponds to the internal cross-section of the tubular element intended, for example, to form the vertical branch of a T-shaped assembly, the body being penetrated longitudinally along its entire length by a bore in which a screw may slide freely. At one end of the body, the bore has a portion of larger diameter in which there is disposed an elongated bushing whose outside diameter is equal to that of the larger diameter bore. The bushing consists of two longitudinal semi-tubular pieces, one being smooth and part of the body, and the other threaded and meshing with the screw and sliding in the larger diameter portion of the bore. The threaded tubular piece has a lateral exterior shoulder in the vicinity of one of its ends which is intended to cooperate with the frontal face of the body of the coupling in such a way as to form a jaw which grips a carrying wall when the threaded tubular piece is brought toward the interior of the bore portion of larger diameter under the action of the screw.

BRIEF DESCRIPTION OF THE DRAWINGS

FIG. 1 is a perspective view of a body portion of a branch member of a coupling according to the present invention.

FIG. 2 is a perspective view of a key portion used with the body portion of the branch member of FIG. 1.

FIG. 3 is a section along the line III — III of FIG. 2.

FIG. 4 illustrates another embodiment of the present invention whereby a pointed-end screw cooperates with a key portion similar to that of FIG. 2.

FIG. 5 represent an end view of a branch member of the coupling according to the present invention in a blocked state within a square tubular element.

FIG. 6 is a perspective schematic view of a coupling with three branch members disposed in a rectangular trihedral.

FIG. 7 is a perspective view of a body portion of a branch member for use in a T-coupling.

DESCRIPTION OF THE PREFERRED EMBODIMENTS

Figure 8:
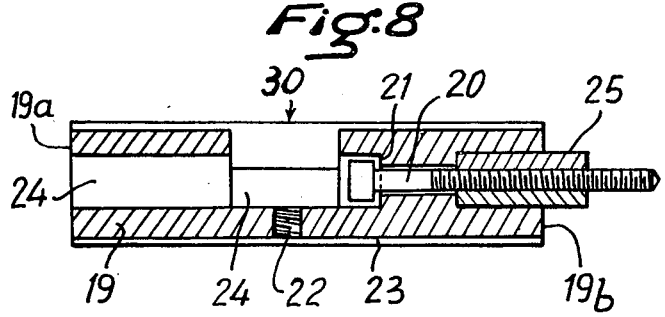
FIG. 8 illustrates in cross-section a view along the line VIII — VIII of FIG. 7.

In FIGS. 1 to 3 a coupling intended for the assembly of tubular elements with square cross-sections is shown. The assembly carries several branch members such as the one shown which are intended to be respectively placed within and then blocked in the tubular elements.

The branch member 1 is shown in the form of a bar or body portion 1' of a generally square cross-section which is somewhat smaller than the internal cross-section of the sections of the tubular elements to be assembled. Each of the faces in the body portion 1' has a groove such as 2 formed therein. Each groove is wider than it is deep defining thereby straight rib portions along each of the edges of the faces. The grooves 2 permit placing the coupling into the tubular element without difficulty and even when the tubular element has a coupling flange 31 on one side of its inner wall (see FIG. 5), which is generally the case for welded tubular elements. The rib portions permit a linear contact against the inside surface of the tubular element which is much more certain than a surface contact because of the defects in the internal surface of the tubular element.

The body portion 1' has a lateral slot 3 perpendicular to the longitudinal axis of the body portion which is limited by a diagonal bottom surface 4. A threaded bore 5 extends along the longitudinal axis of the body portion 1' and traverses the slot 3 by forming in the bottom surface 4 a threaded semi-circular groove 6. In the bore 5, a headless socket screw which is not shown meshes with the threads and has its conical extremity pointed toward the slot 3, the conical extremity having an apex angle of 90°.

In the slot 3 there is placed a wedging key portion 7 (FIG. 2) of generally triangular cross-section which, when its base surface 8 rests on the bottom surface 4 of the slot 3, exactly completes the bar which forms the branch member 1. On the base surface 8 there is provided a cutout or groove 9 which cooperates with the groove 6 to form a passage for the pointed-end screw. The groove 9, however, does not extend over the entire length of the key portion 7, rather it terminates in a semiconical inside wall 10 (FIG. 3) intended to cooperate with the end of the pointed-end screw.

It is easy to understand that when the end of the pointed-end screw engages with the inside wall 10, the key portion 7 is raised out of the slot 3 toward the internal surface of the tubular element surrounding branch member 1.

FIG. 4 shows that the same effect can be obtained with a key portion 11, whose base surface does not have a groove such as groove 9 but where such a key portion 11 is subjected to the action of a pointed-end screw 12 traversing the body portion 1' upwardly from the lower face 13 at the lateral slot 3, or by a pointed-end screw 14 (shown in broken lines) traversing the body portion 1' sideways from its lateral face 15 at the lateral slot 3. A screw such as screw 12 or 14 is manipulated through a simple circular perforation in the corresponding tubular element.

In all three cases the key tends to be displaced in the direction of the arrow F (FIG. 4), which is perpendicular to the bottom surface 4 of the lateral slot 3, that is to say, perpendicular to the longitudinal axis of the branch member 1 and inclined at preferably 45° with respect to the lower face 13 of the body portion 1'.

When the branch member 1 is placed inside a tubular element 15 (FIG. 5), the key portion 7 or 11 is pressed against two internal side surfaces of the tubular element 15. Through the intermediary action of the pointed-end screw, the reactive forces set up by the engagement with the two internal side surfaces of the tubular element 15, causes the body portion 1' to be strongly pressed against the other two inside walls of the tubular element 15.

It is clear that if another branch member of the coupling is already blocked inside a tubular element, then branch member 1 is fixed in its position with respect to that first tubular element. When one emplaces the tubular element 15 and manipulates its pointed-end screw to cause the wedging of the coupling therein, it suffers a slight displacement with respect to the axis of the branch member 1, and therefore with respect to the first tubular element already in place, this displacement corresponding to the displacement "F" of key portion 11. It is important that this displacement not result in a shift of the two tubular elements so that a perfect junction of the visible coupling edges results. It is therefore necessary that the displacement have a resultant directed toward the exterior of the angle formed by the two branch members considered. Whenever it is necessary to make a square assembly this kind of a resultant displacement is always possible. In effect, whether the plane defined by the two tubular elements be horizontal or vertical or oblique, at least one of the two tubular elements has one of its faces, other than the external face, hidden from view, and it suffices to arrange an access hole in that hidden face for the manipulation of the pointed-end screw which displaces the key portion toward the exterior of the dihedral. The other tubular element, if all its faces are visible, receives a coupling branch member such as that shown in FIGS. 1–3. Blockage of this branch member is effected by an end-manipulation before it is placed in the tubular element carrying the lateral perforation.

When the assembly to be realized is in the form of a rectangular trihedron, the coupling shown in FIG. 6, has of course that same form. It has three branch members 16, 17 and 18, each provided with a key portion 16a, 17a and 18a, respectively, disposed toward the exterior of the trihedron. The displacements $f_1$, $f_2$ and $f_3$ of the key portions 16a, 17a and 18a diverge in such a way that the hidden interior edges of the trihedron are respectively in contact with the interior corresponding corners of the tubular elements. In the embodiment shown in FIG. 6, the manipulation of key portions 16a and 18a is made laterally, starting from the lower hidden faces of the branch members 16 and 18 after first having blocked key portion 17a by an end-manipulation of a pointed-end axial screw of branch member 17. This is not possible, for example, if the hidden faces of branch members 16 and 18 are, as before, the lower faces and branch member 17 is directed upwardly. In that case, the displacements $f_1$ and $f_3$ tend to lift the corresponding tubular elements with respect to the tubular element of branch member 17, and in that case it is the junction line of the latter tubular element with the two others which is hidden and if that junction line is not perfect, the esthetics of the assembly do not suffer. The examples described and represented have to do with coupling square tubular elements. Of course an analogous disposition can be adopted no matter what the cross-section of the sections of tubular elements may be. They may be polygonal or curved. In this last case, it suffices that in the preceding description the term "lower face" of the tubular element or of the branch member of the coupling be replaced with "plane tangent to the lower generating line." In all cases, each key portion has a cross-section perpendicular to the longitudinal axis of the branch member which is as close as possible in size to one-half of the body portion cross-section, with the bottom of the lateral slot formed in that body portion passing through the longitudinal axis.

Figure 10A:
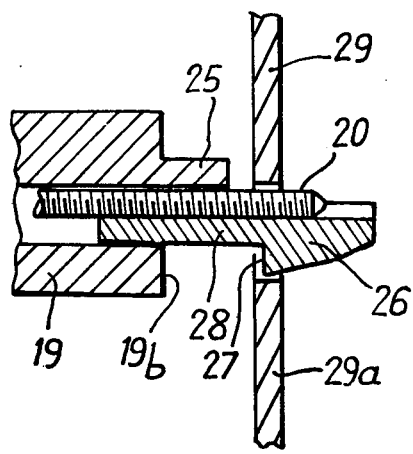
FIGS. 10a, 10b and 10c illustrate in cross-section three steps in the blockage of the coupling of FIGS. 7 and 8 in a carrying wall.
Figure 10B:
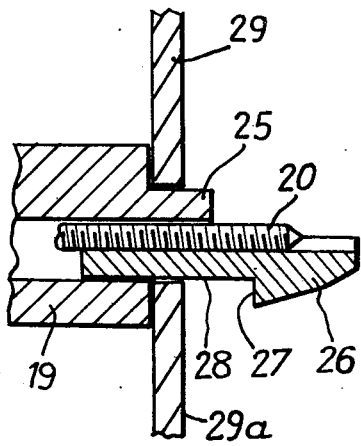
Figure 10C:
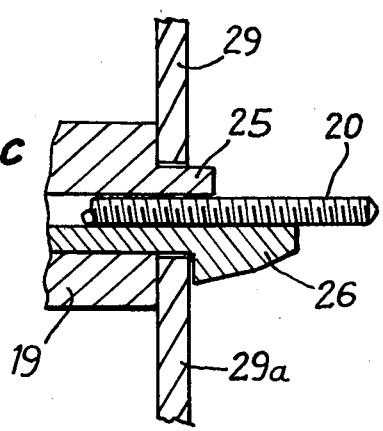

In FIGS. 7 and 8 there is illustrated a coupling for the blind assembly of a T. The body portion 19 of this coupling is similar to the body portion 1' shown in FIG. 1, except that the axial bore 24 is not threaded and serves only as a guide for positioning and access to a socket screw with a cylindrical head. An internal shoulder 21 located beyond a slot 30 with respect to the end 19a is provided for abutment with the cylindrical head of the socket screw. The body portion 19 is intended to be introduced into the tubular element which will form the vertical branch of the T assembly. A threaded bore 22 perpendicular to the longitudinal axis of the body portion 19 opens at one end into the lower face 23 of the body portion 19 and at the other end into the center of the slot 30 in the cut portion of the bore 24. The pointed-end screw intended to move the key portion, which is not shown, travels in the threaded bore 22 and this permits blocking the coupling in the tubular element which forms the vertical stem of the T assembly. In the direction of the face 19b (FIG. 8) the bore 24, which is at first narrowed by the shoulder 21, is enlarged again and terminates at the from face 19b of the coupling. In this larger portion of the bore 24 there is disposed a half-bushing 25 which extends beyond the front face 19b and may be integral with the body portion 19. In practice, this coupling is made of molded material and preferably the half-bushing 25 is of one piece with it (FIGS. 10a, 10b, and 10c).

Figure 9:
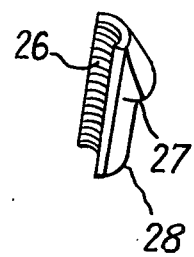
FIG. 9 is a perspective view illustrating means for the hook-up of the coupling of FIGS. 7 and 8.

A second half-bushing 26 (FIG. 9) cooperates with the half-bushing 25 in order to enclose a screw 20 over one portion of its length. The half bushing 26 is displaceable in the larger portion of the bore 24 which is left open by the half-bushing 25 and carries an internal thread which engages with the screw 20. Near one of its ends, the half-bushing 26 has a lateral exterior shoulder 27 extending from its shank portion 28.

It is clear that when the shank portion 28 is drawn completely into the bore 24, the screw 20 may be screwed in until its head abuts against the shoulder 21 to achieve blocking of the shoulder 27 against the front face 19b of the coupling. when beginning from this position, the screw 20 is manipulated in the inverse sense, all the while maintaining its head applied against the shoulder 21, then the half-bearing 26 gradually moves in the outward direction away from the front face 19b. When the shoulder 27 passes the perpendicular plane containing the free end of the half-bushing 25, the end of the half-bearing 26 may be introduced into the circular opening cut into a bearing wall 29. The diameter of the circular opening corresponds to the maximum transverse dimension of the half-bearing 26 (FIG. 10a). After the shoulder 27 has passed through this opening, the coupling assembly can be laterally moved in order to place the shank 28 at the edge of the opening and then longitudinally displaced in order to introduce the end portion of the half-bearing 25 into the opening (FIG. 10b). Thereafter it is sufficient to manipulate the screw 20 in order to bind the end of the opening between the frontal face 19b of the coupling and the shoulder 27 (FIG. 10c).

When the coupling has been blocked on the bearing wall, it is only necessary to emplace on body portion 19 the tubular element which forms the vertical bar of the T assembly, and to block it, as has already been described with respect to FIGS. 1 to 4.

The bearing wall 29 can be the inside wall of a tubular element, or of any closed casing which does not provide access to its face 29a.

So as not to weaken the coupling in the area of the slot 30 it is advantageous to reduce the diameter of the bore 24 and to limit it to that which is necessary for the passage of the manipulating key of the screw 20. In that case, the screw 20 is put into place by introducing it obliquely through an oblong opening cut into the upper face of the coupling and a notch in the opposite face, of the front portion of the front face 19b. This introduction is followed by an upward pivoting while holding it against the half-bearing 25. Thereafter it is only necessary to introduce the half-bearing 26 axially.

What is claimed is:

1. In a coupling for the assembly of closely jointed tubular elements having as many branch members as there are tubular elements to be assembled, said coupling including a branch member, said branch member including a body portion and a key portion with the body portion having a cross-sectional configuration adapted to conform to that of its respective tubular element and includes a maximum dimension being of such a magnitude that the branch member is adapted to be situated within its respective tubular element with a certain play and adapted to be wedged therein by the displacement of its key portion, each said body portion further having a lateral slot which extends into the body portion defining thereby three surfaces, the key being received within said slot and having an outer surface conforming to the inner surface of its respective tubular element and three further surfaces which confront and are coextensive with said three surfaces when the key is within said slot, the improvement wherein each said body portion further has a bore extending from the outer surface of the body portion and intersecting said slot and a displaceably mounted pointed-end screw in said bore and engaging the key portion of its respective branch member and exerting a biasing force thereagainst causing the key to be displaced until the outer surface of the key also engages the inner surface of the respective tubular element, the displacement being in a direction which is perpendicular to the longitudinal axis of the respective body portion and inclined with respect to each of the planes of the angles defined respectively by the plane containing the longitudinal axis of the respective body portion on the one hand and the planes containing the axes of the body portion of the other branch members on the other hand, obtaining an outward displacement directed toward the exterior of each of the angles causing in that direction, as a result of the engagement of said key with its respective tubular element, a slight lateral displacement of the respective tubular element, and adapted to close the visible junction line of the tubular elements with their adjacent tubular elements.

2. A coupling as defined in claim 1, wherein the three surfaces of the lateral slot of each body portion includes a bottom surface, receiving and locating the key, and two opposing side surfaces extending upwardly from the bottom surface, said bottom surface defining a plane passing through the longitudinal axis of the body portion.

3. A coupling as defined in claim 2, wherein said bore formed in at least one of the body portions is an axial threaded bore and includes said displaceable pointed-end screw, said bore in its extent traversing the lateral slot of the body portion and forming in the bottom surface thereof a semi-circular groove, an aligned semi-circular groove with an interior semiconical surface formed in a bottom surface of the key abutting said bottom surface of the lateral slot, said end of said pointed-end screw engaging said semiconical surface, outwardly displacing said key.

4. A coupling as defined in claim 2, wherein the bore formed in at least one of the body portions includes a threaded bore and a displaceable pointed-end screw, said bore extending perpendicular to the longitudinal axis of the body portion and said bottom surface of the lateral slot said bore opening in the vicinity of the center of the lateral slot, and that surface of the key confronting the bottom surface of the lateral slot being substantially flat.

* * * * *